US009100497B2

(12) United States Patent
Preiss et al.

(10) Patent No.: US 9,100,497 B2
(45) Date of Patent: Aug. 4, 2015

(54) METHOD, SYSTEM AND APPARATUS FOR MANAGING PERSONA-BASED NOTIFICATIONS AT A COMMUNICATION DEVICE

(75) Inventors: Bruno Richard Preiss, Waterloo (CA); Sunning Chun Ning Go, Waterloo (CA); Allan David Lewis, New Dundee (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 237 days.

(21) Appl. No.: 13/439,964

(22) Filed: Apr. 5, 2012

(65) Prior Publication Data

US 2013/0268751 A1 Oct. 10, 2013

(51) Int. Cl.
| G06F 15/173 | (2006.01) |
| H04L 12/28 | (2006.01) |
| H04M 1/725 | (2006.01) |
| H04L 12/24 | (2006.01) |
| H04L 29/08 | (2006.01) |

(52) U.S. Cl.
CPC ........... *H04M 1/72563* (2013.01); *H04L 41/08* (2013.01); *H04L 41/0803* (2013.01); *H04L 41/085* (2013.01); *H04L 67/141* (2013.01); *H04M 2250/66* (2013.01)

(58) Field of Classification Search
CPC . H04L 29/08; H04L 41/0803; H04M 1/72563
USPC ................ 709/223, 227, 238; 713/155; 726/5
See application file for complete search history.

(56) References Cited

U.S. PATENT DOCUMENTS

| 6,452,614 | B1 | 9/2002 | King et al. |
| 6,983,319 | B1* | 1/2006 | Lu et al. .......................... 709/223 |
| 7,644,160 | B2* | 1/2010 | Young ............................. 709/225 |
| 2001/0020242 | A1* | 9/2001 | Gupta et al. ................ 707/501.1 |
| 2005/0265252 | A1* | 12/2005 | Banerjee et al. ............... 370/252 |
| 2006/0009981 | A1* | 1/2006 | Engstrom ...................... 704/270 |
| 2006/0052091 | A1 | 3/2006 | Onyon et al. |
| 2006/0173959 | A1 | 8/2006 | McKelvie et al. |
| 2008/0285569 | A1* | 11/2008 | Stademann et al. ...... 370/395.31 |
| 2010/0223654 | A1* | 9/2010 | Kwan et al. ....................... 726/1 |
| 2010/0227632 | A1 | 9/2010 | Bell et al. |
| 2011/0045806 | A1 | 2/2011 | Gupta et al. |
| 2011/0053574 | A1 | 3/2011 | Rice |
| 2011/0061008 | A1 | 3/2011 | Gupta et al. |

(Continued)

FOREIGN PATENT DOCUMENTS

EP 1976321 A1 10/2008

OTHER PUBLICATIONS

Co-pending U.S. Appl. No. 13/609,404; Systems, Devices and Methods for Authorizing Endpoints of a Push Pathway; filed Sep. 11, 2012.

(Continued)

*Primary Examiner* — Linglan Edwards
(74) *Attorney, Agent, or Firm* — Perry + Currier, Inc.

(57) ABSTRACT

A method, system and apparatus for managing persona-based notifications at a communication device are provided. A port is dynamically assigned to an application on the basis of a persona at a communication device, the application enabled to receive notifications from a given provider. The port is registered with a server to receive the notification. The port is opened to receive notifications associated with the persona for the application from the server.

18 Claims, 10 Drawing Sheets

(56) References Cited

U.S. PATENT DOCUMENTS

2011/0173681 A1    7/2011  Qureshi et al.
2011/0264800 A1*  10/2011  Allred et al. .................. 709/224
2012/0173610 A1*   7/2012  Bleau et al. .................. 709/203
2012/0210415 A1    8/2012  Somani et al.
2013/0057695 A1*   3/2013  Huisking ...................... 348/156

OTHER PUBLICATIONS

"Local and Push Notification Programming Guide" Apple Inc., Aug. 9, 2011, XP002690579, Retrieved from the Internet: URL: http://developer.apple.com/library/mac/documetation/NetworkingInternet/Conceptual/RemoteNotificationsPG/RemoteNotificationsPG.pdf; Retrieved on Jan. 17, 2013.

Related European patent application No. 12183882.5 Search Report dated Feb. 7, 2013.

Dan . . . @growl.Info: "Issue 426: Growl in a multi user environment does not behave as a user would expect", Jan. 27, 2012, pp. 1-2, XP055071805 Retrieved from the Internet: URL: http://code.google.com/p/growl/issues/detail?id=426 [retrieved on Jul. 17, 2013.

European Patent Application No. 13160329.2 Search Report dated Aug. 2, 2013.

* cited by examiner

METHOD, SYSTEM AND APPARATUS FOR MANAGING PERSONA-BASED NOTIFICATIONS AT A COMMUNICATION DEVICE

FIELD

The specification relates generally to communication devices, and specifically to a method, system and apparatus for managing persona-based notifications at a communication device.

BACKGROUND

The evolution of computers is currently quite active in the mobile device environment. It is now well-known to including calendaring, contacts, and messaging functions in mobile devices. More recently, there has been a veritable explosion of the number and type of applications that are configured to the unique form factors and computing environments of mobile devices.

In particular mobile devices are increasingly enabled to operate using personas corresponding to one or more of different user credentials, log-in credentials, persona identifiers and the like. When a given persona is active at a mobile device, it is configured to operate in given manner associated with the given persona. For example, a mobile device can be enabled to operate with a "Corporate" persona and a "Consumer" persona, with the mobile device configured to operate differently in each persona, for example receive email, messages etc., for a given identifier associated with the persona (e.g. a corporate email address for the "Corporate" persona and personal email address for the "Consumer" persona), and have respective calendars associated with each persona, and the like. An outstanding issue with personas, however, is that applications at mobile devices are generally independent of personas with regard to notifications; hence applications notifications are received independent of persona, which inherently defeats the purpose of personas, when subscribed notifications for one persona are provided while another persona is active.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
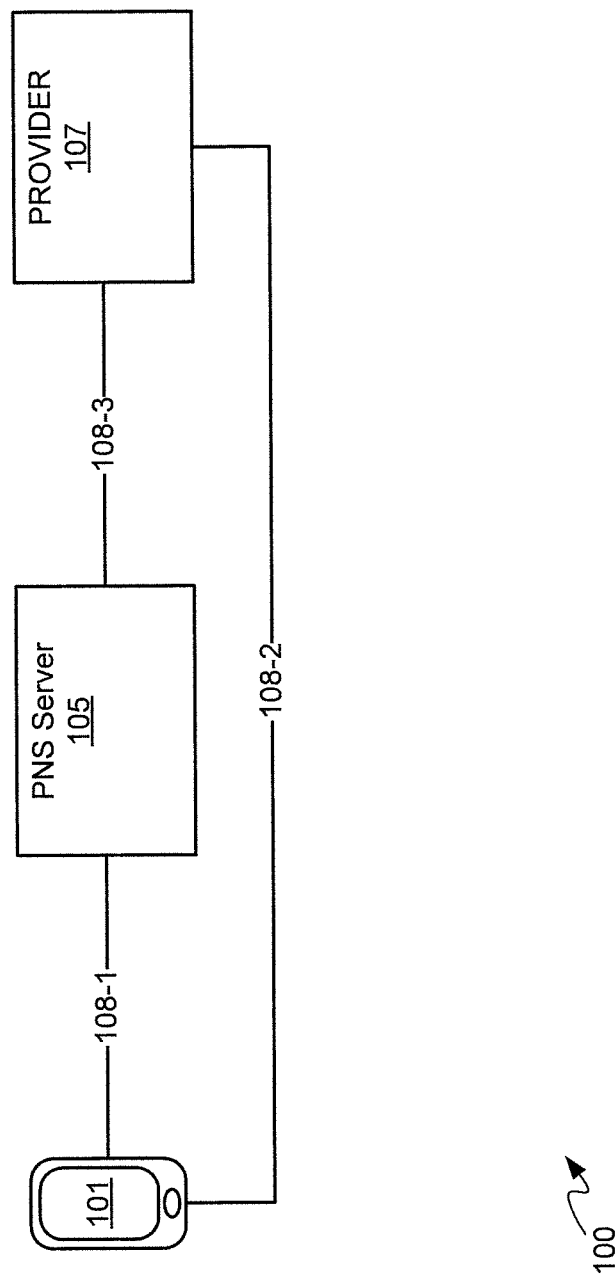
FIG. 1 depicts a system for managing persona-based notifications at a communication device, according to non-limiting implementations.

An aspect of the specification provides a method comprising: dynamically assigning a port to an application on the basis of a persona at a communication device, the application enabled to receive notifications from a given provider; registering the port with a server to receive the notifications; and, opening the port to receive notifications associated with the persona for the application from the server.

The port can be opened when the persona is active at the communication device.

Or, the port can be opened only when the persona is active at the communication device.

The port can be dynamically assigned when the application is first processed at the communication device under the persona, and the port can be static thereafter with regards to the persona.

The same application can be assigned a plurality of ports in a one-to-one relationship with each persona at the communication device under which the application is processed.

The persona can be rendered active by receipt of one or more of: user credentials, log-in credentials, and one or more identifiers unique to the persona at the communication device.

The method can further comprise, when the persona is inactive, closing the port such that notifications associated with the persona are not received from the server.

Registering the port can comprise transmitting an associated port identifier with a provider identifier to the server.

The method can further comprise registering the port with the provider to receive the notifications via the server.

Registering the port with the provider can comprise transmitting a time-sensitive token to the provider comprising an encrypted associated port identifier. And the method can further comprise exchanging decryption data for decrypting the encrypted associated port identifier with the server, such that the time-sensitive token can be transmitted by the provider to the server for decryption and verification, the server thereafter transmitting to the provider the encrypted associated port identifier, the provider thereafter transmitting the notifications to the server with the encrypted associated port identifier for delivery to the communication device.

Another aspect of the specification provides a communication device comprising: a processing unit interconnected with a communication interface, said processing unit enabled to: dynamically assign a port to an application on the basis of a persona at the communication device, the application enabled to receive notifications from a given provider; register the port with a server to receive the notifications; and, open the port to receive notifications associated with the persona for the application from the server.

The processing unit can be further enabled to open the port when the persona is active at the communication device.

Alternatively the processing unit can be further enabled to open the port only when the persona is active at the communication device.

The processing unit can be further enabled to dynamically assign the port when the application is first processed at the communication device under the persona, and the port can be static thereafter with regards to the persona.

The processing unit can be further enabled to assign a plurality of ports to the same application in a one-to-one relationship with each persona at the communication device under which the application is processed.

The processing unit can be further enabled to render the persona active by receipt of one or more of: user credentials, log-in credentials, and one or more identifiers unique to the persona at the communication device.

The processing unit can be further enabled to close the port when the persona is inactive such that notifications associated with the persona are not received from the server.

The processing unit can be further enabled to register the port by transmitting an associated port identifier with a provider identifier to the server.

The processing unit can be further enabled to register the port with the provider to receive the notifications via the server.

The processing unit can be further enabled to register the port with the provider by transmitting a time-sensitive token to the provider comprising an encrypted associated port identifier.

The processing unit can be further enabled to exchange decryption data for decrypting the encrypted associated port identifier with the server, such that the time-sensitive token can be transmitted by the provider to the server for decryption and verification, the server thereafter transmitting to the provider the encrypted associated port identifier, the provider thereafter transmitting the notifications to the server with the encrypted associated port identifier for delivery to the communication device.

A further aspect of the specification provides a computer program product, comprising a computer usable medium having a computer readable program code adapted to be executed to implement a method comprising: dynamically assigning a port to an application on the basis of a persona at a communication device, the application enabled to receive notifications from a given provider; registering the port with a server to receive the notifications; and, opening the port to receive notifications associated with the persona for the application from the server. The computer program product can be a non-transitory computer program product.

FIG. 1 depicts a system 100 for managing persona-based notifications at a communication device 101, according to non-limiting implementations. Communication device 101 is enabled to communicate with a push notifications service (PNS) server 105 and a provider server 107 via respective links 108-1, 108-2. PNS server 105 is enabled to communicate with provider server 107 via a link 108-3. PNS server 105 will also be referred to hereafter as server 105. Communication device 101 will be also referred to hereafter as device 101. This convention will be used elsewhere in the present specification. Provider server 107 will also be referred to hereafter as provider 107. Furthermore, links 108-1, 108-2, 108-3 will also be referred to hereafter generically as a link 108, and collectively as links 108. This convention will be used elsewhere in the present specification. It is further appreciated that device 101 can receive notifications from provider 107 via server 105, in that provider 107 transmits notifications to server 105, which in turn transmits the notifications to device 101.

While only one device 101 and only one provider 107 are depicted in FIG. 1, it is appreciated that system 100 can comprise any suitable number of devices, similar to device 101, and any suitable number of providers, similar to provider 107. For example device 101 can be enabled to receive notifications from any suitable number of providers, and provider 107 can be enabled to transit notifications to any suitable number of devices. Server 105 is enabled as a conduit through which notifications are transmitted from the providers to the devices.

Furthermore, in some implementations, device 101 and server 105 can be associated, for example via a corporate entity: in other words, server 105 can be operated by a corporate entity and device 101 can be distributed to an employee of the corporate entity. Hence, in these implementations, provider is appreciated to be a third party provider of notifications relative to device 101 and server 105. In some implementations device 101 can be associated with a plurality of providers, for example from multiple corporate entities.

Further, device 101 is generally enabled to receive notifications from server 105. Indeed, in this regard, device 101 can be considered a client of server 105.

Device 101 is further generally enabled to operate using personas. For example, device 101 can be associated with one or more of different user credentials, log-in credentials, persona identifiers and the like. When a given persona is active at device 101, device 101 is configured to operate in a given manner associated with the given persona. For example, device 101 can be enabled to operate with a "Corporate" persona and a "Consumer" persona; device 101 can hence be one or more of: logged into under each of the two personas: and switched between the two personas. Device 101 can be configured to operate differently in each persona, for example receive email, messages etc., for a given identifier associated with the persona (e.g. a corporate email address for the "Corporate" persona and personal email address for the "Consumer" persona), and have respective calendars associated with each persona, and the like. In some implementations, device 101 can be enabled to operate with more than one "Corporate" persona and/or more than one "Consumer" persona. However, it is appreciate that the number and type of personas with which device 101 is enabled to operate is generally non-limiting. Furthermore, the "personas" on device 101 can be associated with a single user of device 101; alternatively, device 101 can comprise multiple user accounts and each user account can be associated with multiple personas. It is appreciated that each persona is distinct and further that users' personas are distinct.

An outstanding issue with personas, however, is that applications at device 101 are generally independent of personas with regard to notifications; hence applications notifications are received independent of persona.

However, system 100 does not suffer from such a problem: rather, as will presently be explained, device 101 is generally enabled to: dynamically assign a port to an application on the basis of a persona, the application enabled to receive notifications from a given provider, such as provider 107; register the port with a server to receive the notifications, such as server 105; and, open the port to receive notifications associated with the persona for the application from server 105 when the persona is active at device 101. Hence, notifications can be received at applications on the basis of which persona is active at device 101.

Hence, personas can serve to distinguish between application instances running on the same device (and/or different devices). In the following discussion it is assumed that device 101 comprises one or more associated personas and that each persona has a globally unique identifier, as described below.

Device 101 comprises any suitable communication device for receiving notifications from provider 107, for example via server 105. Device 101 includes, but is not limited to, any suitable combination of communication devices, personal computers, laptop computers, portable electronic devices, mobile communication device, portable communication devices, tablet communication devices, laptop communication devices, desktop phones, telephones, PDAs (personal digital assistants), cellphones, smartphones and the like. Other suitable communication devices are within the scope of present implementations.

Each link 108 comprises any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), access points, and the like, and/or a combination.

Figure 2:
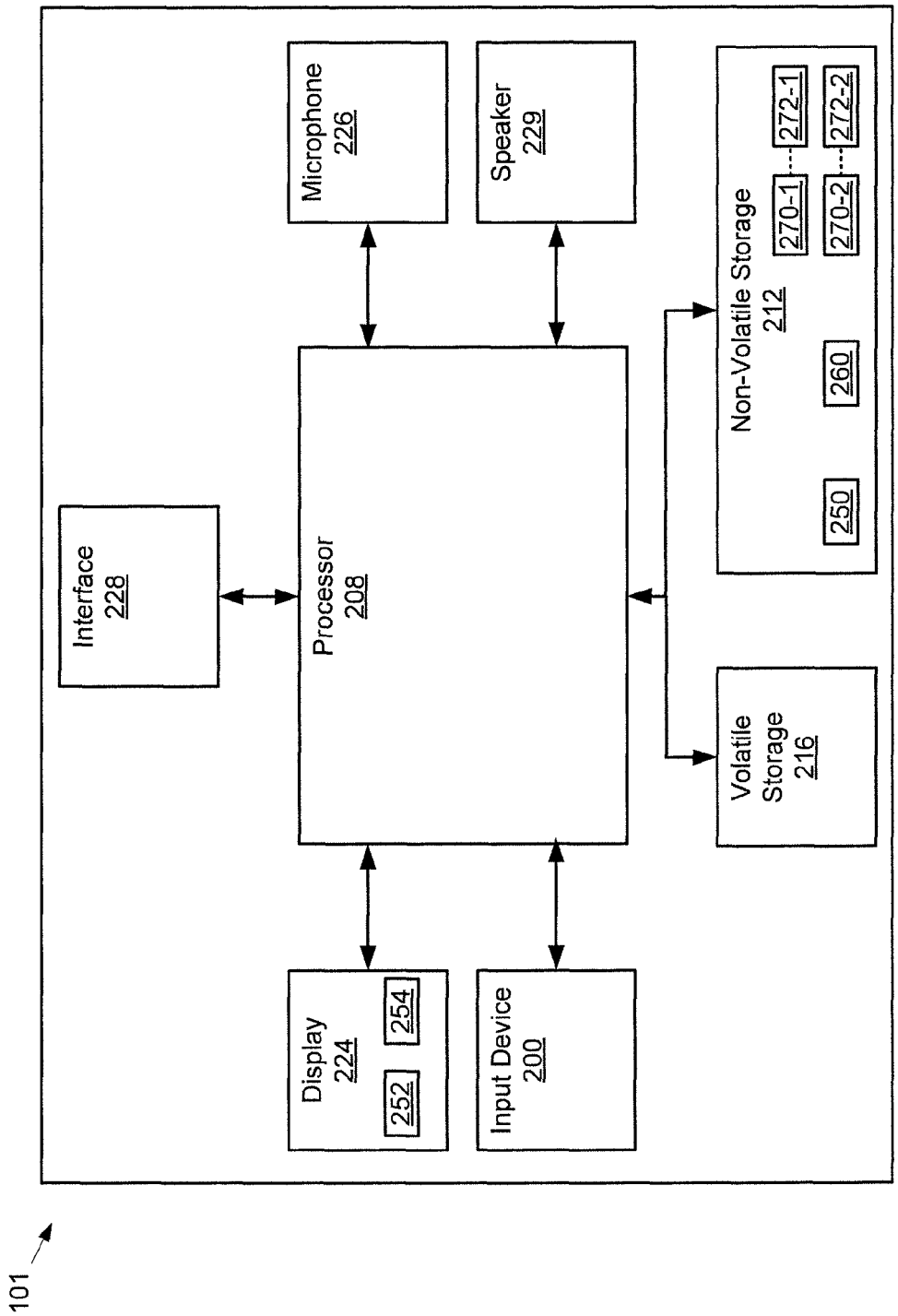
FIG. 2 depicts a schematic diagram of a communication device of FIG. 1, according to non-limiting implementations.

Attention is directed to FIG. 2, which depicts a schematic diagram of device 101 according to non-limiting implementations. It should be emphasized that the structure in FIG. 2 is purely exemplary, and contemplates a device that can be used for both wired and/or wireless voice (e.g. telephony), and wired and/or wireless data communications (e.g. email, web browsing, text, and the like). Device 101 comprises at least one input device 200 generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from input device 200 is received at processor 208 (which can be implemented as a plurality of processors). Processor 208 is configured to communicate with a non-volatile storage unit 212 (e.g. Erasable Electronic Programmable Read Only Memory ("EEPROM"), Flash Memory) and a volatile storage unit 216 (e.g. random access memory ("RAM")). Programming instructions that implement the functional teachings of device 101 as described herein are typically maintained, persistently, in non-volatile storage unit 212 and used by processor 208 which makes appropriate utilization of volatile storage 216 during the execution of such programming instructions. Those skilled in the art will now recognize that non-volatile storage unit 212 and volatile storage 216 are examples of computer readable media that can store programming instructions executable on processor 208. Furthermore, non-volatile storage unit 212 and volatile storage 216 are also examples of memory units and/or memory modules.

Processor 208 in turn can also be configured to communicate with a display 224, and optionally a microphone 226 and a speaker 229. Display 224 comprises any suitable one of or combination of CRT (cathode ray tube) and/or flat panel displays (e.g. LCD (liquid crystal display), plasma, OLED (organic light emitting diode), capacitive or resistive touchscreens, and the like).

Microphone 226, when present, comprises any suitable microphone for receiving sound, which can be converted to sound data. Speaker 229, when present, comprises any suitable speaker for providing sound data at device 101. It is appreciated that microphone 226 and speaker 229 can be used in combination at device 101 to conduct a voice call.

In some implementations, input device 200 and display 224 are external to device 101, with processor 208 in communication with each of input device 200 and display 224 via a suitable connection and/or link.

Processor 208 also connects to a network communication interface 228, interchangeably referred to hereafter as interface 228, which can be implemented as one or more radios configured to communicate over links 108-1, 108-2. In general, it will be understood that interface 228 is configured to correspond with the network architecture that is used to implement links 108-1, 108-2. In other implementations a plurality of links with different protocols can be employed and thus interface 228 can comprise a plurality of interfaces to support each link.

Non-volatile storage 212 generally stores at least one application 250 which, when processed by processor 208, enables processor 208 to provide notifications associated with application 250, for example by controlling circuitry 252 at display 224 to render a representation 254 of application 250 and/or associated notifications. Non-limiting examples of application 250 can include, but are not limited to, newspaper applications (e.g. associated notifications could include headlines), business applications (e.g. associated notifications could include stock prices), sports applications (e.g. associated notifications could include scores of sporting events), and the like.

It is appreciated that application 250 is merely one example of a client application that can be processed at device 101, and that device 101 can be enabled to process more than one application. In general application 250 comprises a push target for associated notifications received from provider 107 via server 105.

Non-volatile storage 212 also generally a stores a PNS agent 260, also referred to hereafter agent 260. Agent 260 comprises a software entity that implements the client-side interface of server 105. Agent 260, when processed by processor 208, can be enabled to maintain an always-on connection with server 105, for example over link 108-1. Agent 260 forwards push notifications received from server 105 to the appropriate client application instance, for example application 250 as the push target.

It is further appreciated that application 250 is enabled to receive notifications from provider 107 via server 105 and at least one assigned port at device 101. A port is a communications endpoint on device 101, which can be identified via any suitable identifier. For example, notifications received at device 101 are generally transmitted to a given port, which in turn is assigned to a given application, such as application 250. Dynamic assignment of ports by agent 260 will be explained below with reference to FIGS. 5 to 7. Agent 260 can further ensure that port numbers are not reused.

In some implementations, application 250 can be associated with provider 107 such that notifications received from provider 107 are provided at device 101 via application 250; in some of these implementations, application 250 can be pre-provisioned with an identifier of provider 107 and/or an identifier of application 250.

Notifications can be received at device 101 and provided at display 224, for example by controlling display 224 to render a notification in representation 254, which can include a rendering of application 250.

As previously discussed, device 101 is further enabled to operate under different personas. As such, non-volatile storage 212 further comprises at least one identifier 270-1, 270-2 for each persona, which can be configured in a provisioning process. Hence, when a given persona is active, a given one of identifiers 270 can be used to identify the active persona. For example identifiers 270 can include user-credentials, log-in credentials, persona identifiers and indeed any one or more identifiers unique to a given persona at device 101. It is appreciated that each at least one identifier 270 for each persona can be globally unique and/or unique at device 101.

Two set of identifiers 270 are depicted in implementations of FIG. 2, meaning that device 101 is enabled to operate using two personas. However, device 101 can be enabled to operate with any given number of personas. When device 101 is enabled to operate with more than two personas, more than two identifiers 270 are stored at non-volatile storage 212, with a set of identifiers 270 for each persona in a one-to-one relationship. However, device 101 an also be enabled to operate using one persona, and hence would store one identifier 270.

Each identifier 270-1, 270-2 is associated with respective configuration data 272-1, 272-2 which instructs device 101 how to operate when a given persona is active. Hence, when a given persona is activated, for example by receiving an indication of a given identifier 270 at input device 200, the associated configuration data 272 is processed by processor 208 to configure device 101.

In some implementations device 101 can be further enabled to determine a time, for example by a clock device (not depicted) and/or by requesting a time from a network device (e.g. server 105 and/or any other suitable network device).

Indeed, it should be understood that in general a wide variety of configurations for device 101 are contemplated.

Figure 3:
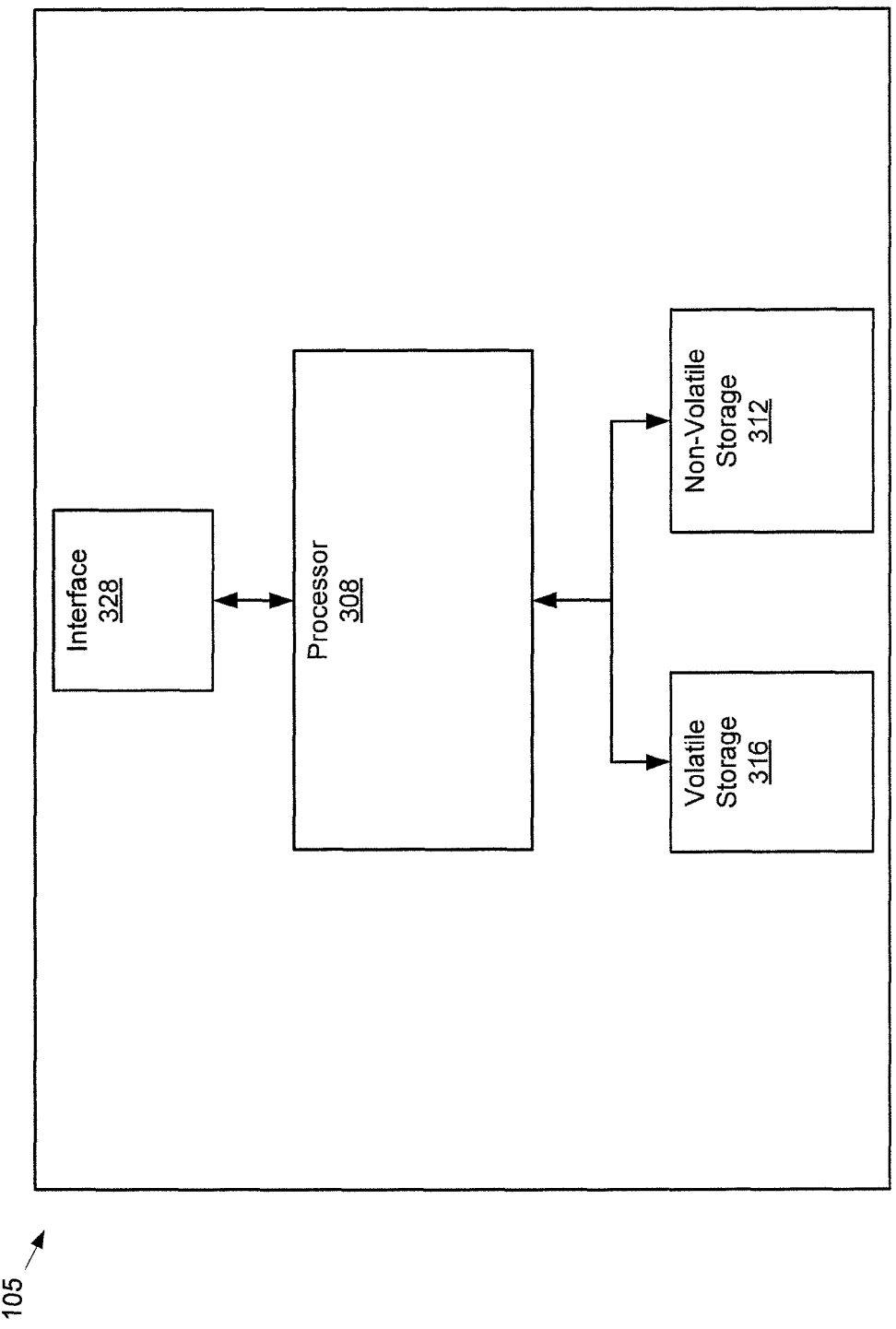
FIG. 3 depicts a schematic diagram of a server of FIG. 1, according to non-limiting implementations.

Attention is next directed to FIG. 3, which depicts a schematic diagram of server 105 according to non-limiting implementations. It is appreciated that elements of server 105 can be substantially similar to, or different from, device 101. In any event, FIG. 3 is substantially similar to FIG. 2, with like elements having like numbers, however beginning with a "3" rather than a "2"; for example, processor 308 is substantially similar to processor 208. Specifically, server 105 comprises processor 308, non-volatile storage 312, volatile storage 316, and interface 328.

Server 105 can be based on any well-known server environment including a module that houses one or more central processing units, volatile memory (e.g. random access memory), persistent memory (e.g. hard disk devices) and network interfaces to allow server 105 to communicate over links 108-1, 108-3. For example, server 105 can be a Sun Fire V480 running a UNIX operating system, from Sun Microsystems, Inc. of Palo Alto, Calif., and having four central processing units each operating at about nine-hundred megahertz and having about sixteen gigabytes of random access memory. However, it is to be emphasized that this particular server is merely exemplary, and a vast array of other types of computing environments for server 105 are contemplated. It is further more appreciated that server 105 can comprise any suitable number of servers that can perform different functionality of server implementations described herein.

In particular, server 105 is enabled to receive notifications from provider 107 and in turn push notifications to device 101. Indeed, it is appreciated that server 105 comprises an infrastructure component that terminates always-on connections from devices, including but not limited to device 101. Hence, server 105 receives notifications from provider service instances, such as provider 107, and forwards those notifications to the appropriate devices, such as device 101. When a device is not connected, server 105 can store any notifications received for the unconnected device until such time as the device has reconnected.

In some implementations server 105 can be further enabled to determine a time, for example by a clock device (not depicted) and/or by requesting a time from a network device.

Further functionality of server 105 will be described below.

Figure 4:
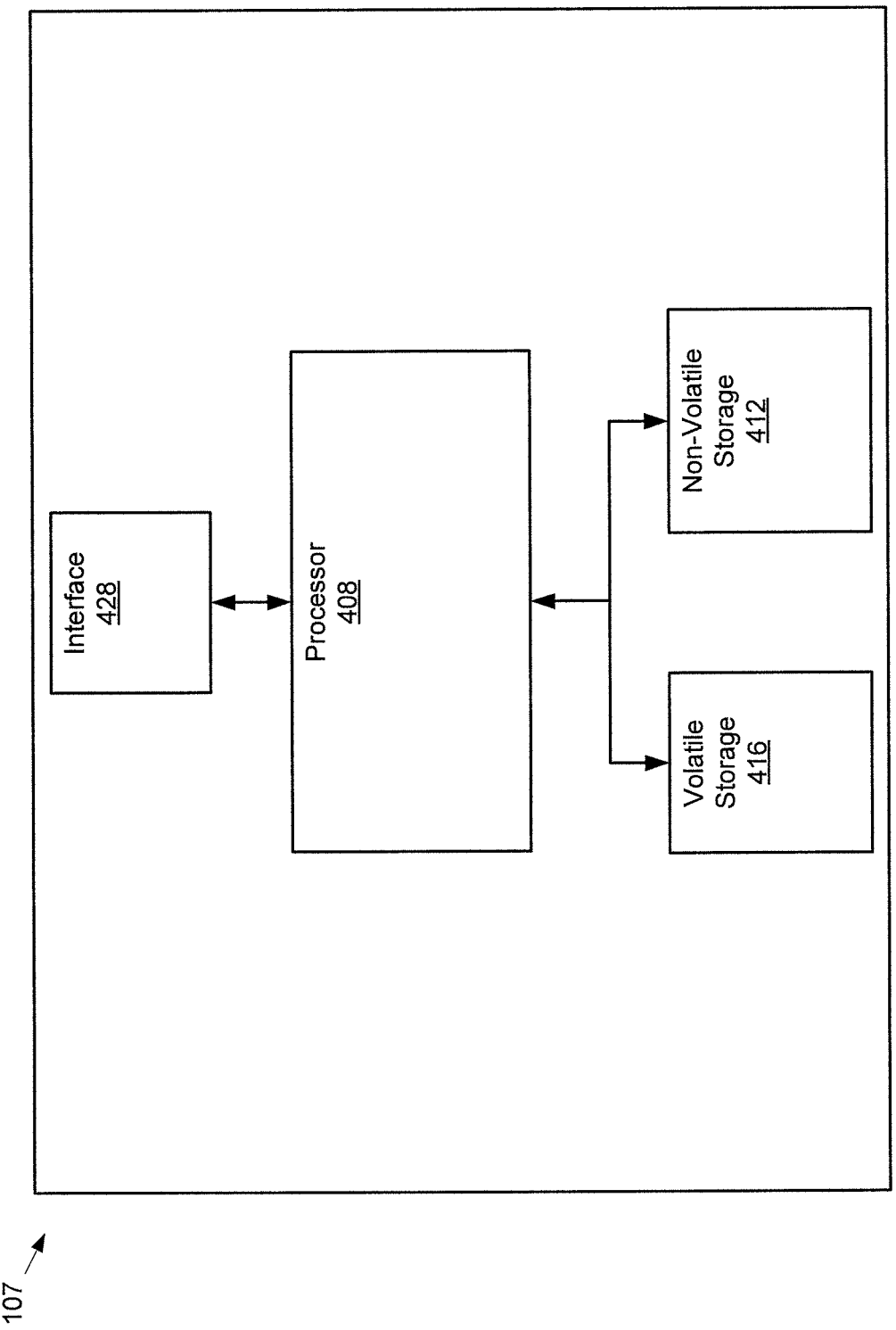
FIG. 4 depicts a schematic diagram of a provider server of FIG. 1, according to non-limiting implementations.

Attention is next directed to FIG. 4, which depicts a schematic diagram of provider 107 according to non-limiting implementations. It is appreciated that elements of provider 107 can be substantially similar to, or different from, device 101. In any event, FIG. 4 is substantially similar to FIG. 3, with like elements having like numbers, however beginning with a "4" rather than a "3"; for example, processor 408 is substantially similar to processor 308. Specifically, provider 107 comprises processor 408, non-volatile storage 412, volatile storage 416, and interface 428.

Provider 107 can be based on any well-known server environment including a module that houses one or more central processing units, volatile memory (e.g. random access memory), persistent memory (e.g. hard disk devices) and network interfaces to allow provider 107 to communicate over links 108-2, 108-3. For example, provider 107 can be a Sun Fire V480 running a UNIX operating system, from Sun Microsystems, Inc. of Palo Alto, Calif., and having four central processing units each operating at about nine-hundred megahertz and having about sixteen gigabytes of random access memory. However, it is to be emphasized that this particular server is merely exemplary, and a vast array of other types of computing environments for provider 107 are contemplated. It is further more appreciated that provider 107 can comprise any suitable number of servers that can perform different functionality of server implementations described herein.

In particular, provider 107 is enabled to transmit notifications to server 105 to be pushed to device 101. Indeed, it is appreciated that provider 107 comprises a server associated with an Internet service and/or a service in an enterprise Intranet, wherein provider 107 pushes asynchronous notifications to push targets (e.g. client applications such as application 250) on devices, such as device 101, via server 105. A connection from provider 107 to server 105, e.g. via link 108-3, need not be an always-on connection. Further, provider 107 can establish a separate connection to server 105 for each push notification; alternatively, provider 107 can stream multiple push notifications to server 105 over the same connection. Further functionality of provider 107 will be described below.

Figure 5:
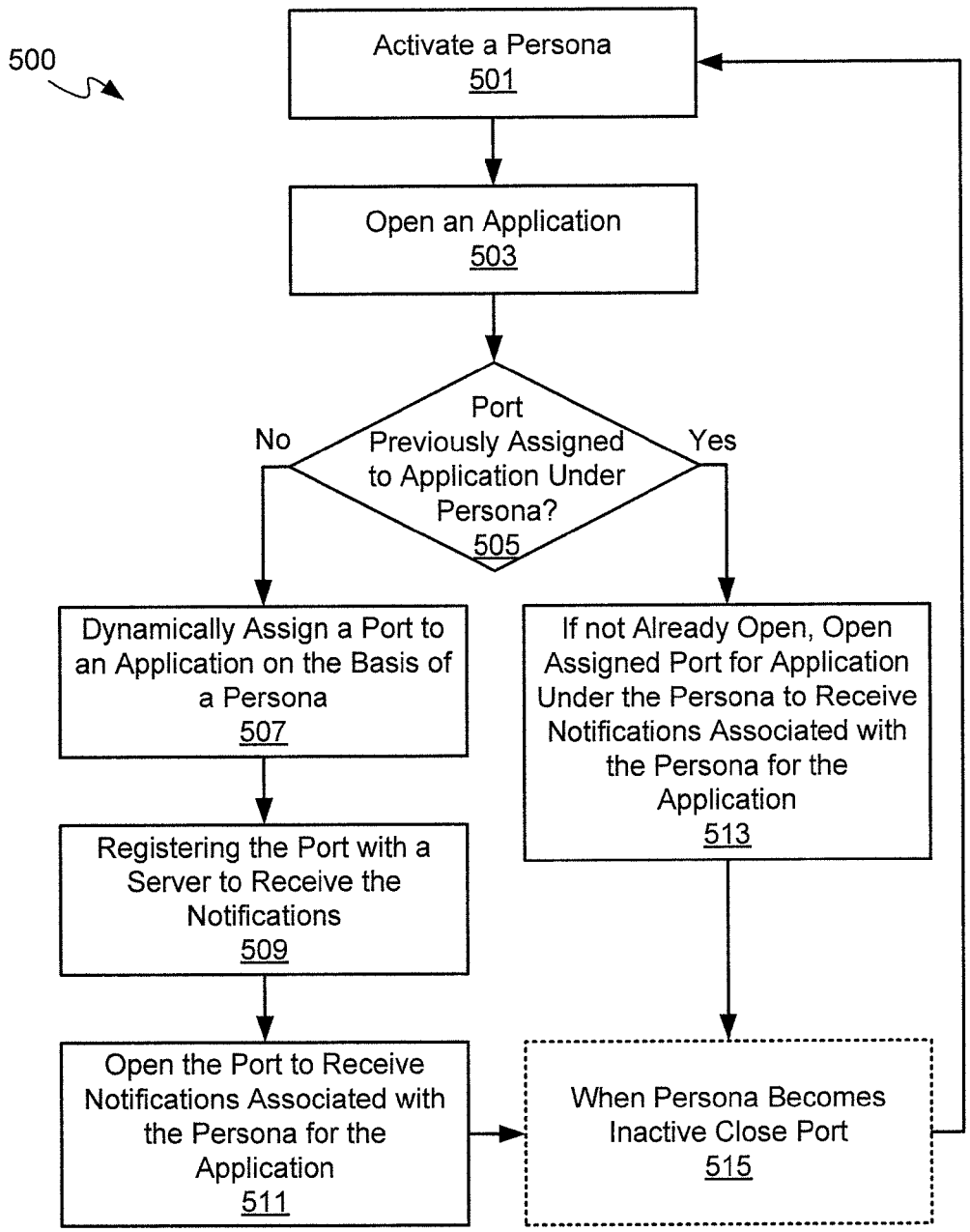
FIG. 5 depicts a method for managing persona-based notifications at a communication device, according to non-limiting implementations.

Attention is now directed to FIG. 5 which depicts a method 500 for managing persona-based notifications at a communication device, according to non-limiting implementations. In order to assist in the explanation of method 500, it will be assumed that method 500 is performed using system 100. Furthermore, the following discussion of method 500 will lead to a further understanding of system 100 and its various components. However, it is to be understood that system 100 and/or method 500 can be varied, and need not work exactly as discussed herein in conjunction with each other, and that such variations are within the scope of present implementations.

It is appreciated that, in some implementations, method 500 is implemented in system 100 by processor 208 of device 101. Indeed, method 500 is one way in which device 101 can be configured. It is to be emphasized, however, that method 500 need not be performed in the exact sequence as shown, unless otherwise indicated; and likewise various blocks may be performed in parallel rather than in sequence; hence the elements of method 500 are referred to herein as "blocks" rather than "steps". It is also to be understood, however, that method 500 can be implemented on variations of system 100.

At block 501 a persona is activated at device 101. A persona can be activated at device 101 by receipt of one or more of: user credentials, log-in credentials, and one or more identifiers unique to the persona at the communication device. For example, an identifier is received via input device 200 and compared to identifiers 270. When a match is found, the associated configuration data 272 is processed by processor 208. Device 101 is thereafter configured to operate under the active persona.

At block 503, application 250 is opened. At block 505 it is determined whether a port has previously been assigned to application 250 under the active persona. For example, processor 208 can determine whether any ports are already assigned to application 250 under the active persona; indeed, a person of skill in the art would appreciate that a record of port assignments could be stored at non-volatile storage 212 and hence the record and/or list of port assignments could be processed to determine whether a port has been previously assigned to application 250 under the active persona.

In some implementations, as depicted, a record of port assignments can be stored at configuration data 272; hence, to determine whether any ports are already assigned to application 250 under the active persona, the corresponding configuration data 272 can be processed.

Block 505 can be implemented via processor 208 processing agent 260. In other words, agent 260 can be enabled to monitor applications being opened and closed, as well to perform dynamic assignment of ports.

In any event, when no port has been previously assigned to application 250 under the active persona, at block 507, agent 260 dynamically assigns a port to application 250 on the basis of the active persona of device 101.

Figure 6:
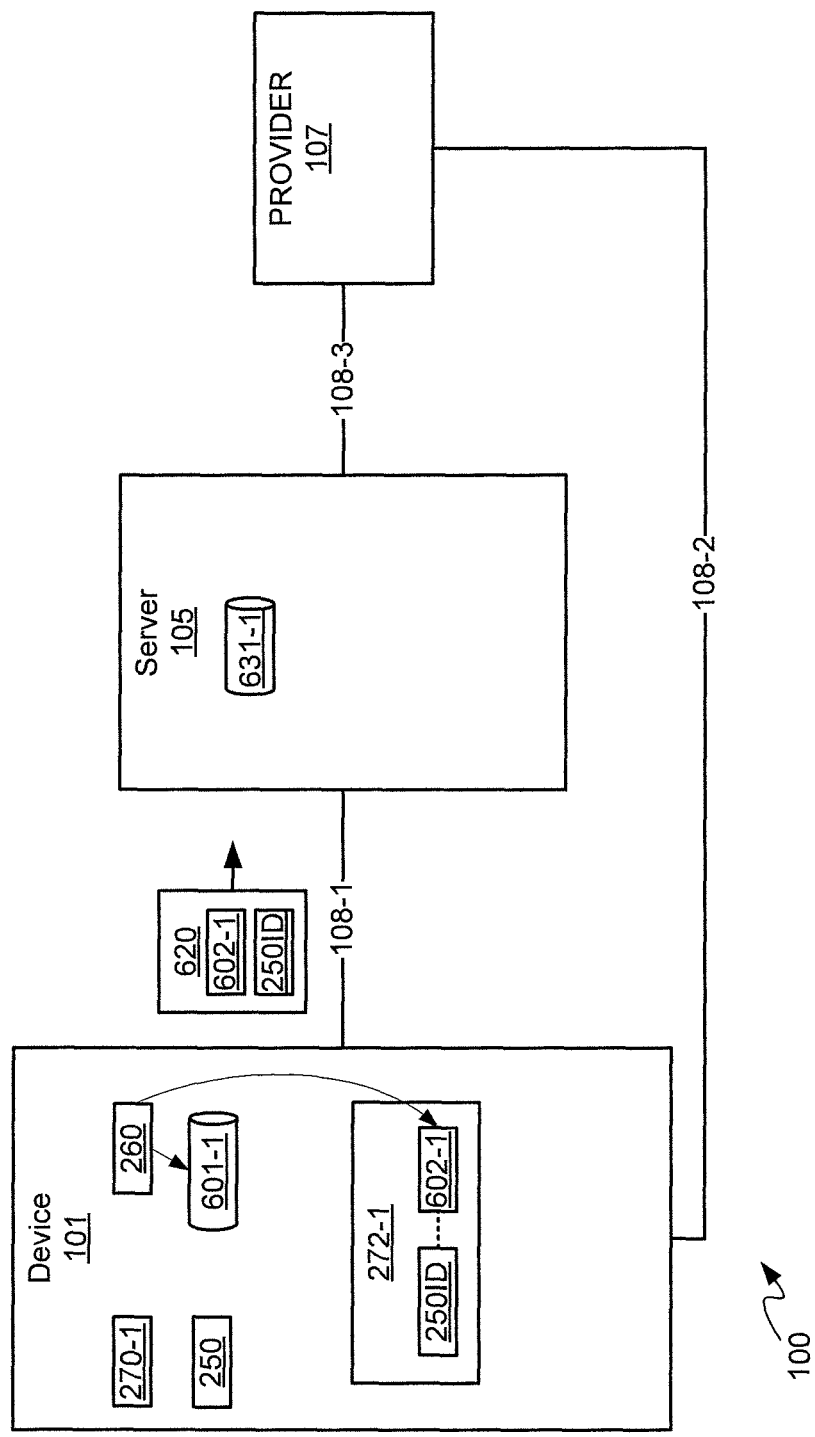
FIGS. 6 and 7 depict the system of FIG. 1 with dynamic port assignment, according to non-limiting implementations.

For example, attention is directed to FIG. 6 which depicts a subset of elements of system 100, but it is appreciated that all elements of system 100 are nonetheless present. For example, while processor 208 is not depicted at device 101, it is nonetheless appreciated that processor 208 is present and further processing application 250 and agent 260 are also present.

Further, FIG. 6 assumes that: a persona associated with identifier 270-1 has been activated, for example at block 501; application 250 has been opened, for example at block 503; and it has been determined that application 250 has not yet been assigned a port.

Hence, as application 250 has not yet been assigned a port, agent 260 dynamically assigned a port to applications 250, for example port 601-1. Further, agent 260 stores a record of the assignment, for example by updating a record and/or list of port assignments and/or by updating configuration data 272-1 with: an identifier 250ID of one or more of provider 105 and application 250; and an identifier 602-1 of port 601-1, for example a port number associated with port 601-1. It is assumed that application 250 has been pre-configured with identifier 250ID and/or obtains identifier 250ID by any suitable out-of-band process. Further application 250 can be assigned an application identity when application 250 is packaged and signed for execution on device 101.

Hence, it is appreciated that a port 601 can be assigned to application 250 by agent 260 the first time application 250 connects to agent 260.

At block 509, device 101 registers port 601-1 with server 105 so that notifications specific to the active persona and associated with application 250 can be received. Registering port 601-1 can comprise transmitting an associated port identifier 620 with a provider identifier to the server 105. For example, in depicted implementations, device 101 transmits one or more identifiers 620 to server 105 for storage at non-volatile storage 312. Identifiers 620 comprise identifier 602-1 of port 601-1 and identifier 2501D.

In some implementations identifiers 620 can be referred to as a channel identifier. In response to receiving identifiers 620, server 105 opens a channel 631-1. It is appreciated that a channel merely represents an association between a port and a provider, for example, port 601-1 and provider 107. Indeed, it is further appreciated that a given channel is associated with exactly one port; hence, in the example of FIG. 6, channel 631-1 is associated with port 601-1 and further associated with provider 107.

Returning to FIG. 5, at block 511, if not already opened upon assignment, port 601-1 is opened to receive notifications associated with the persona for application 250 from server 105 when the persona is active at device 101.

In some implementations, port 601-1 is opened when the persona is active at device 101. In further implementations, port 601-1 is opened only when the persona is active at device 101. In yet further implementations, port 601-1 can be opened to receive notifications associated with persona identified via identifier 270-1, but the notifications are not provided at application 250 until the persona is active. Indeed, it is appreciated that notifications can be received when a persona is "active" and/or when a persona is inactive. Further, in some implementations, personas can be active all the time and/or permanently active. In yet further implementations, more than more than one persona can be active at the same time.

In some implementations, device 101 continues to operate according to the active persona until the persona becomes inactive. For example, an active persona can be logged out of, and/or device 101 can be switched to operate according to a different persona by a new persona being activated. In any event, when the persona becomes inactive, port 601-1 is closed at block 515 such that notifications associated with the persona are not received from server 105. However, in other implementations, block 515 is skipped and port 601-1 remains open when the persona becomes inactive, though notifications may not be delivered to application 250 until the persons again becomes active.

When the persona associated with identifier 270-1 is again activated at block 501, and application 250 is again opened at block 503, at block 505 it will be determined that port 601-1 has already been assigned to application 250.

In these implementations, at block 513, if not already open, port 601-1 assigned for application 250 under the persona associated with identifier 270-1 is opened to receive notifications associated with the persona for application 250. In some implementations, port 601-1 will be closed at block 515 when the persona becomes inactive; however in other implementations, block 515 is skipped and port 601-1 remains open when the persona becomes inactive, though notifications may not be delivered to application 250 until the persona again becomes active.

Hence, it is further appreciated that port 601-1 is dynamically assigned when application 250 is first processed at device 101 under the persona associated with identifier 270-1, and port 601-1 is static thereafter with regards to the associated persona.

Figure 7:
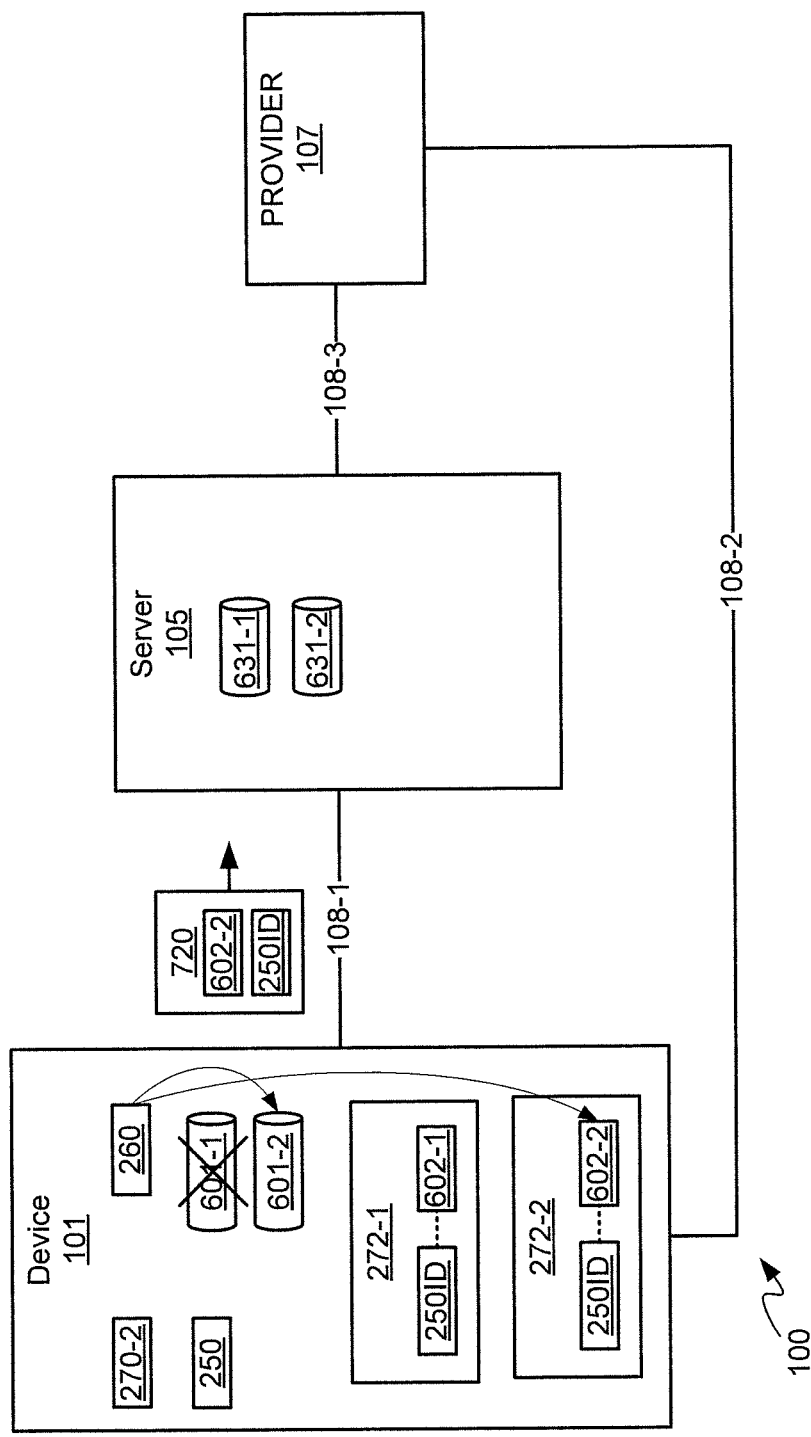

Attention is next directed to FIG. 7, which is substantially similar to FIG. 6 with like elements having like numbers. In FIG. 7, however, the persona associated with identifier 270-1 has been deactivated and hence port 601-1 is closed by agent 260. Further, the persona associated with identifier 270-2 has been activated and a new instance of application 250 is processed under this persona. (Nonetheless, it is again appreciated that notifications can be received when a persona is "active" and/or when a persona is inactive; further, in some implementations, personas can be active all the time and/or permanently active; in yet further implementations, more than more than one persona can be active at the same time.) Hence, when method 500 is implemented at device 101 under these conditions, at block 505 it is determined that no port has been previously assigned to application 250 under the active persona associated with identifier 270-2. Hence, at block 507, a port 601-2 is dynamically assigned to application 250, port 601-2 being different from port 601-1, and identified via an identifier 602-2 different from identifier 602-1.

Further, agent 260 stores a record of the assignment, for example by updating a record and/or list of port assignments and/or by updating configuration data 272-2 with: an identifier 250ID of one or more of provider 105 and application 250; and an identifier 602-2 of port 601-2, for example a port number associated with port 601-2.

At block 509, device 101 registers port 601-2 with server 105 so that notifications associated with application 250 and specific to the active persona associated with identifier 270-2 can be received. Registering port 601-2 can comprise transmitting an associated port identifier with a provider identifier to the server 105. For example, in depicted implementations, device 101 transmits one or more identifiers 720 to server 105 for storage at non-volatile storage 312. Identifiers 720 comprise identifier 602-2 of port 601-1 and identifier 2501D. In some implementations identifiers can be referred to as a channel identifier and hence identifier 720 is a different channel identifier then identifier 620.

In response to receiving identifiers 720, server 105 opens a channel 631-2 different from channel 631-1. As described above a channel merely represents an association between a port and a provider, for example, port 601-1 and provider 107. Hence, it is further appreciated that, as a given channel is associated with exactly one port, in the example of FIG. 7, channel 631-2 is associated with port 601-2 and further associated with provider 107. Further, channel 631-2 is different from channel 631-1 as each channel 631 is associated with a different port 601.

Hence, it is appreciated that application 250 is assigned a plurality of ports 601 in a one-to-one relationship with each persona at device 101 under which application 250 is processed. However, it is further appreciated that until an application is processed under a given persona, a port need not be assigned for that application. For example, comparing FIGS. 6 and 7, port 601-2 is not assigned until: a. the persona associated with identifier 270-2 is activated; and b. application 250 is processed under that persona.

Further port identifiers 602 can comprise any suitable number of identifiers for identifying a respective port 601. In specific non-limiting implementations, each port identifier 602 can have the following format: portId=(deviceId, chapterId, portNumber), wherein each identifier 602 comprises a portId, deviceId comprises an identifier of device 101, (e.g. a MAC (media access control) address, a PIN (personal identification number) and the like), and each of chapterId and portNumber comprises respective integers of suitable length, for example 32-bits.

The purpose of the chapterId is to ensure that ports allocated to a previous owner of device 101 cannot be accessed by a new owner of device 101. For example, in these implementations, the lifetime of device 101 can be viewed as a sequence of chapters. A chapter begins the first time agent 260 at device 101 runs and ends when device 101 is wiped. Each chapter has a unique chapterId and has an associated chapterSecret that can be generated by server 105 using a cryptographic random number generator and can be used by server 105 to authenticate the owner of the chapter. Server 105 can maintain a copy of the (chapterId, chapterSecret) pair for device 101, for example at non-volatile storage 312 and/or an accessible database and the like. Further, server 105 can maintain a copy of the (chapterId, chapterSecret) pair for each of its associated client devices. Agent 260 also maintains a copy of the (chapterId, chapterSecret) at the device 101, for example stored at non-volatile storage 212. When agent 260 connects to server 105, agent 260 generally does one of the following: (1.) Submit the (chapterId, chapterSecret) pair, if it has one, (e.g. over SSL (secure sockets layer)) to server 105; or (2.) Ask the PNS server to begin a new chapter. When agent 260 does (1.), server 105 verifies that the submitted (chapterId, chapterSecret) pair matches the one stored at, for example, non-volatile storage 312. When there is a match, server 105 determines a "connection success" and continues with any associated processes (e.g. transmitting sending any buffered notifications to device 101); otherwise server 105 disconnects from device 101. When agent 260 does (2.), server 105 will first delete all channels associated with device 101 (see below) and any buffered notifications for device 101. Server 105 will further generate a new (chapterId, chapterSecret) pair and return it to device 101, and specifically to agent 260. When device 101 is wiped, agent 260 deletes the local copy of the (chapterId, chapterSecret) pair as well as a local list of ports. The next time agent 260 is processed, agent 260 asks server 105 to begin a new chapter. It is appreciated that neither the chapterId nor the chapterSecret is revealed to client applications, such as application 250. Rather, the chapterSecret is only exchanged between agent 260 and server 105 during a connection establishment procedure. Further, in these implementations, agent 260 ensures that portIds associated with a given chapterId are unique.

In some implementations, an identifier of a channel 631 can comprise channeld=(portId, providerId), where the portId is a port identifier as described above, and the providerId (e.g. identifier 250ID) is an identifier of provider 107. It is assumed that the client application knows the providerId or obtains it by some out-of-band means. Hence, a channel is associated with one port and a provider. Further, there can be zero, one or more channels 631 associated with a given port 601. For example, more than one channel can be associated with a given port in the implementations where an application aggregates notifications from multiple providers: an example of such an application is an RSS (Really Simple Syndication) feed aggregator.

In any event, in this manner, device 101 is enabled to receive notifications for application 250 under different personas. Hence, a "Corporate" persona can be registered with provider 107 to receive corporate related notifications at application 250 and a "Consumer" persona can be registered to receive consumer related notifications at applications 250. Indeed, every instance of application 250 under different personas can receive persona-specific notifications by virtue of assigning different ports to each instance of application 250 for each persona, opening the respective port when the persona is activated and closing the respective port when the persona is deactivated. In some alternative implementations, however, the ports can be always open, but notifications received on a given port can be stored, for example at non-volatile storage 212, until the associated persona is activated, the notifications are then provided via application 250 when application 250 is processed.

Hence, it is appreciated that the relationship between ports 601 and push targets under a given persona is one-to-one. In other words, every client application, such as application 250, is associated with one port 601 under a given persona, and a port 601 is associated with exactly one client application, such as application 250.

In some implementations, in order to receive push notifications from server 105, application 250 is to be connected to server 105. However, for reasons of efficiency, it may be desirable to stop application 250 from running for a period of time rather than leave application 250 running. Hence, in some implementations, device 101 can be enabled to optionally launch application 250 upon receipt of a notification from server 105. In some of these implementations, application 250 registers with agent 250 to launch upon receipt of an associated notification. When application 250 has registered to be launched under these conditions, agent 260 leaves associated port 601 open when processor 208 stops processing application 260. When a notification is received and application 250 is registered to be launched, agent 260 launches application 250 and optionally waits for application 250 to connect to server 105 in order to deliver the notification.

Heretofore only dynamic assignment of ports has been discussed. Next, registration with provider 107 is described such that notifications can be received from provider 107 at device 101 via server 105. It is assumed in the following discussion that a port 601 has been assigned to a given instance of application 250 under a given persona as described above.

It is further assumed that an associated channel 631 has been established at server 105.

Application 250 can be registered at provider 107 by transmitting suitable identifiers of device 101 to provider 107. The identifiers can be transmitted from provider 107 to server 105 with any notifications that server 105 is to transmit to device 101. However, this can have associated security issues in that provider 107 has access to the identifiers of device 101 and the identifiers of device 101 can repeatedly be transmitted in the clear, for example as server 105 or provider 107 generally don't control how identifiers are transmitted. For example, the deviceId, described above, is personally identifiable information (PII). In general, server 105 should be enabled not to reveal PII to third party entities such as provider 107, assuming that device 101 and server 105 are associated with a similar entity, such as a corporate entity. Therefore, the portId discussed above, should not by exposed to providers such as provider 107.

Figure 8:
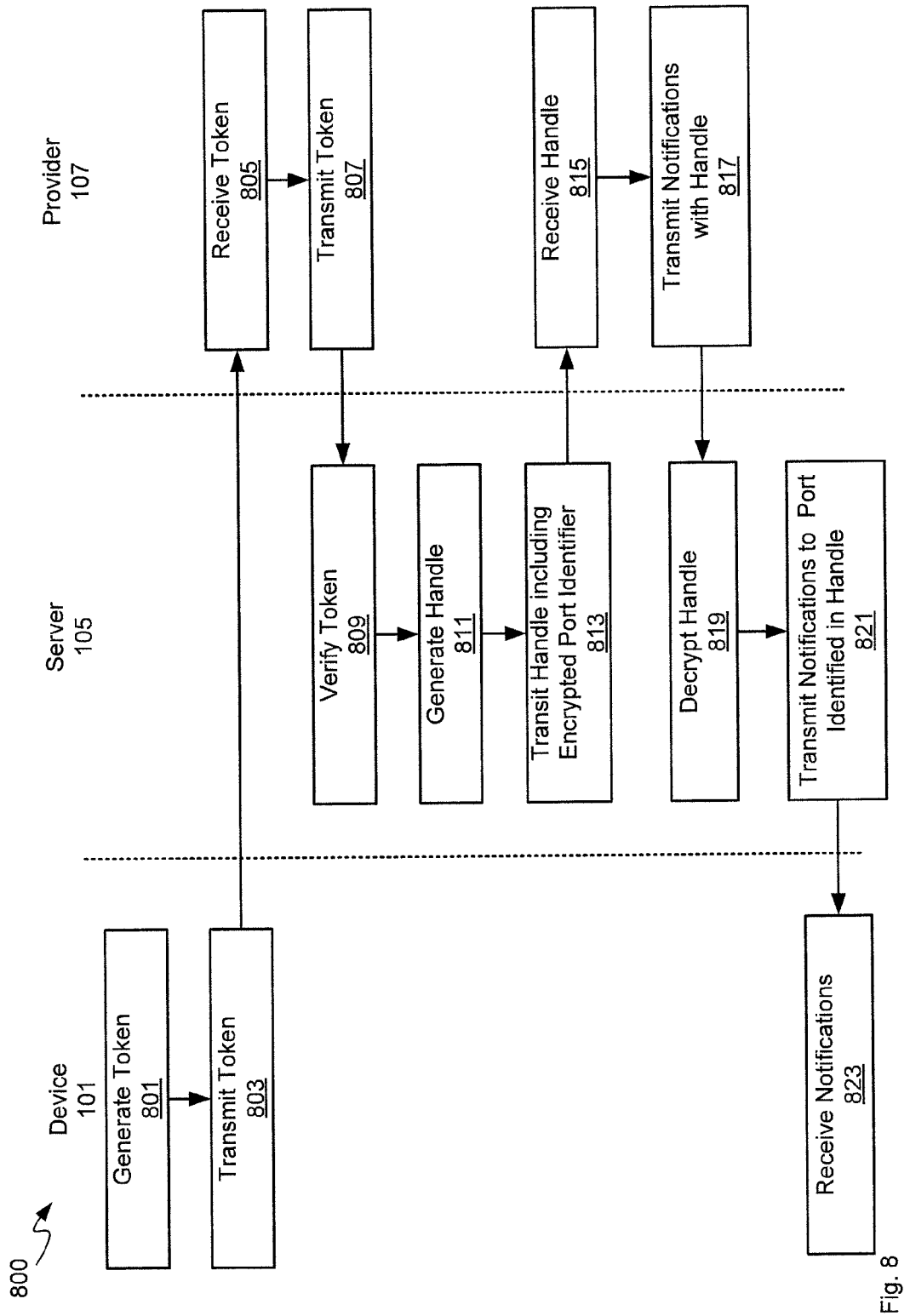
FIG. 8 depicts a method for managing security of persona-based notifications in the system of FIG. 1, according to non-limiting implementations.

To address these issues, attention is directed to FIG. 8, which depicts a method 800 for managing security of persona-based notifications at a communication device, according to non-limiting implementations. In order to assist in the explanation of method 800, it will be assumed that method 800 is performed using system 100. Furthermore, the following discussion of method 800 will lead to a further understanding of system 100 and its various components. However, it is to be understood that system 100 and/or method 800 can be varied, and need not work exactly as discussed herein in conjunction with each other, and that such variations are within the scope of present implementations.

It is appreciated that, in some implementations, method 800 is implemented in system 100 by processors 208, 308, 408 of respectively device 101, server 105, and provider 107. Indeed, method 800 is one way in which system 100 can be configured. It is to be emphasized, however, that method 800 need not be performed in the exact sequence as shown, unless otherwise indicated; and likewise various blocks may be performed in parallel rather than in sequence; hence the elements of method 800 are referred to herein as "blocks" rather than "steps". It is also to be understood, however, that method 800 can be implemented on variations of system 100.

Figure 9:
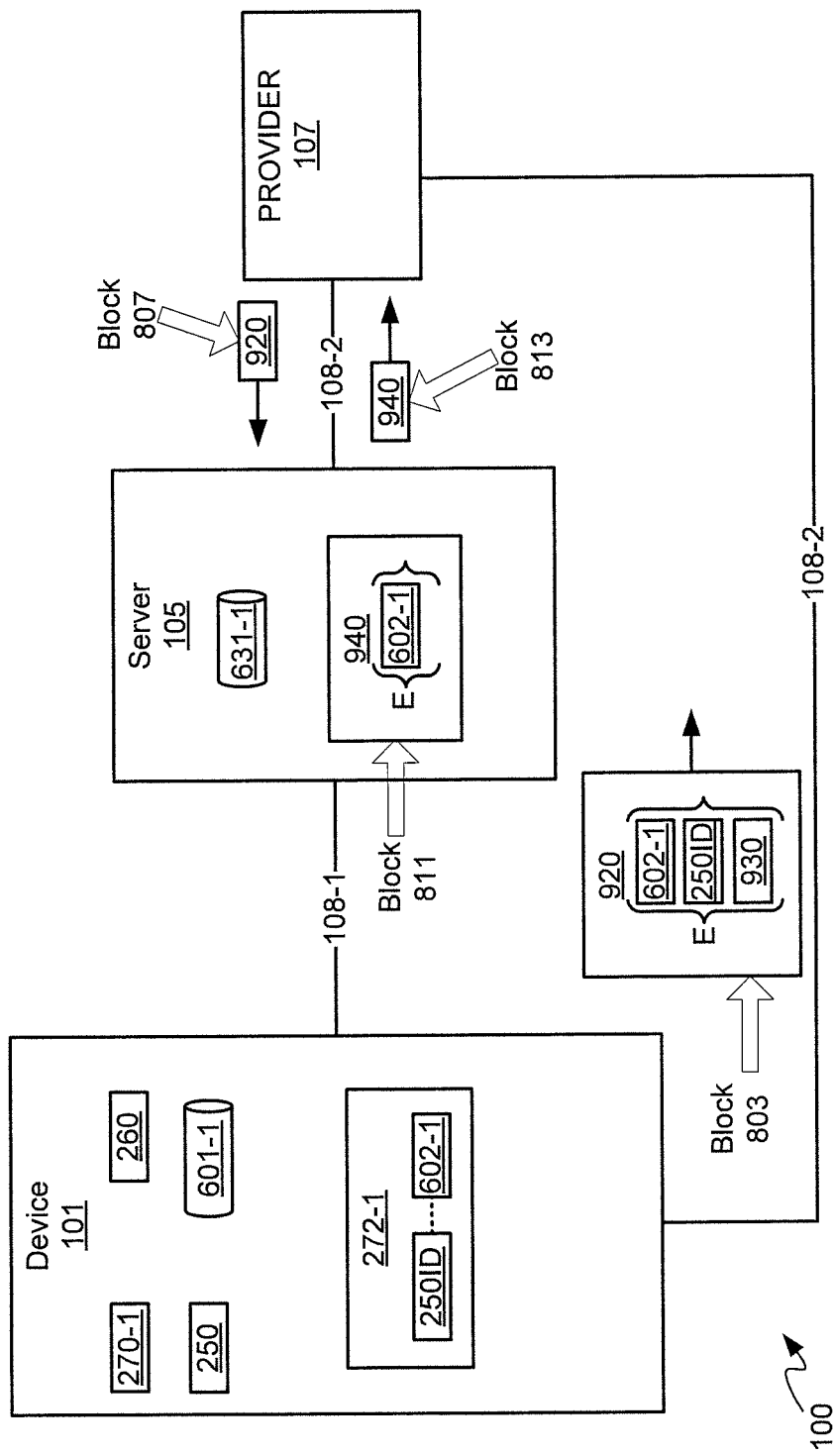
FIGS. 9 and 10 depict the system of FIG. 1 with the method of FIG. 8 implemented therein, according to non-limiting implementations.
Figure 10:
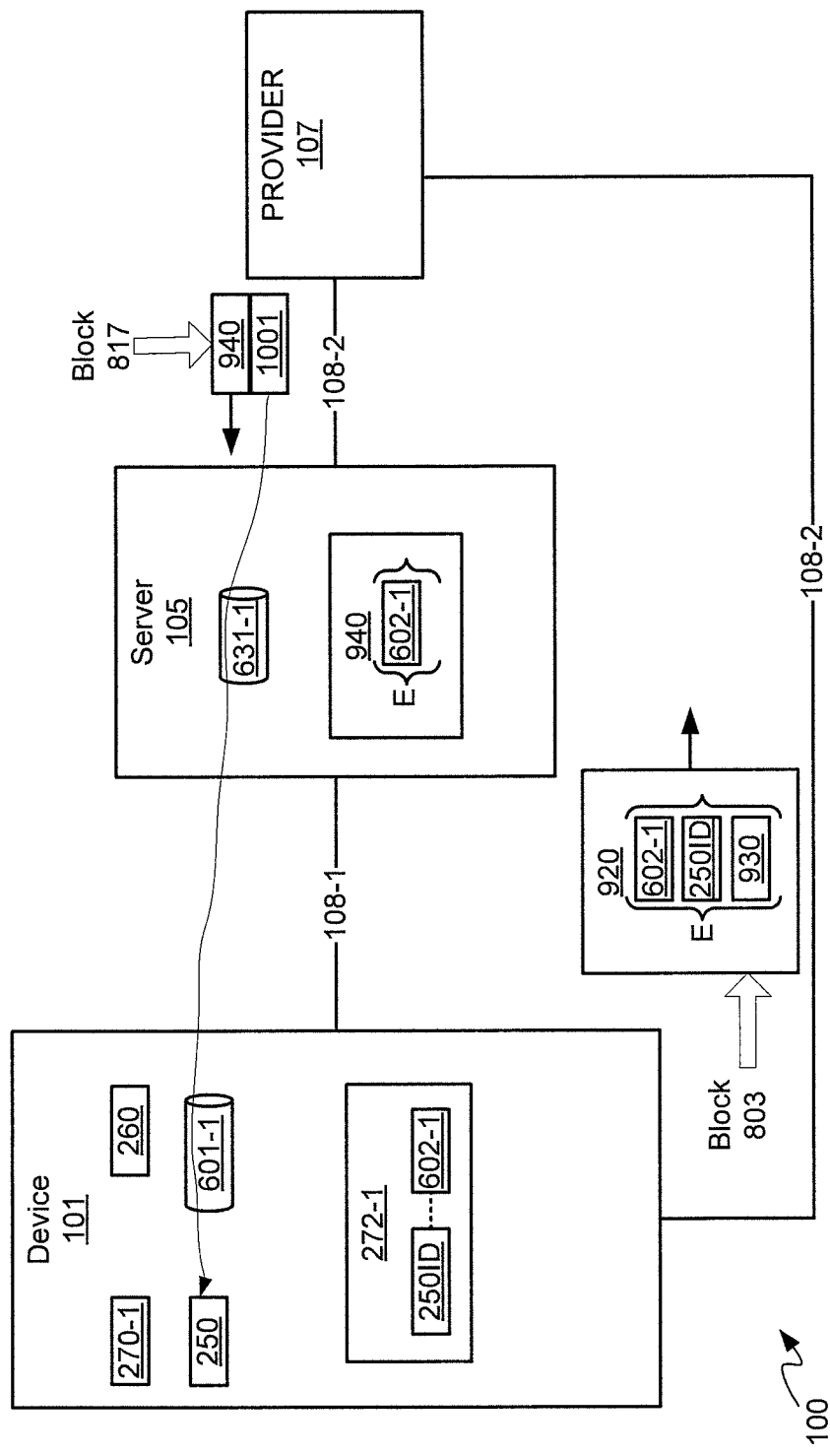

Further reference will be made to FIGS. 9 and 10 which are substantially similar to FIG. 6, with like elements having like numbers. In FIGS. 9 and 10, it is assumed that the persona associated with identifier 270-1 is active, application 250 and agent 260 are being processed by processor 208, and port 601-1 is open.

It is further assumed in method 800 and FIGS. 9, 10 that a registration process has occurred, for example initiated by a user to register device 101 with provider 107 to determine which types of notifications are to be received. For example, in some implementations, there is a "subscription" process during which application 250 communicates with provider 107, for example via link 108-2, in order to "turn on" notifications. Further, during the subscription process some form of user credentials can be provided to provider 107 from device 101: for example, credentials such as a user name and password can be transmitted from device 101 to provider 107 along with a credit card number, or the like, in order to initiate push notifications from provider 107.

At block 801 a time-sensitive token 920 is generated at device 101. The token can comprise identifier 602-1 of port 601-1, an identifier of one or more of application 250 and provider 107, for example identifier 250ID, and a time stamp 930. The time stamp can be a time at which token 920 was generated as determined by a clock at device 101 and/or by device 101 requesting a time from a network device.

It is further appreciated that identifier 602-1, identifier 250ID, and time stamp 930 are encrypted, and can be decrypted using a decryption key known to server 105. Keys for encrypting data transmitted by device 101 and decrypting the data at server 105 can be exchanged between device 101 and server 105 prior to method 800 initiating and/or at any suitable point in method 800.

The purpose of token 920 is to enable device 101 to prove to provider 107 that device 101 owns the port in a given provider handle, as described below, (and is therefore entitled to request provider 107 to push to that port using the given provider handle), and further to do so opaquely.

In specific non-limiting implementations, token 920 can have the following format: T=E{portId, providerId, timestamp}, where T is token 920, portId and providerId have been described above, timestamp is the time of creation of the token, and E{ } indicates the argument is encrypted and integrity protected using a key known to server 105.

At block 803, device 101 transmits token 920 to provider 107, for example via link 108-2. In some implementations token 920 can be transmitted during the subscription process. At block 805, provider 107 receives token 920. Then, either immediately upon receipt of token 920 and/or shortly thereafter, at block 807, provider 107 transmits token 920 to server 105, for example via link 108-2. It is appreciated that provider 107 can be pre-provisioned with the network address of server 105.

At block 809, server 105 verifies token 920 by decrypting token 920 using an appropriate key as described above and then comparing time stamp 930 to a current time. When the time in time stamp is within a given time period of the current time (e.g. a few minutes), and hence token 920 is still fresh (i.e. relatively new), at block 811 server 105 generates a provider handle 940. Handle 940 generally comprises an encrypted associated port identifier and specifically the same port identifier received in token 920: i.e. identifier 602-1 and/or portID.

In some implementations, server 105 periodically changes the key used to encrypt handle 940. When the key is changed, server 105 continues to accept handles generated with the previous key for a given amount of time so as to allow new provider handles to be generated gracefully rather than all at once.

In specific non-limiting implementations, handle 920 can have the following format: H=E{portId}, where H is handle 920, portID is the same portID received with token 920 and E{ } again indicates the argument is encrypted and integrity protected using a key known to server 105.

In any event, returning to FIG. 8, at block 813, handle 940 is transmitted to provider 107, for example via link 108-3. It is further appreciated that provider 107 is enabled to determine whether a handle 940 is received in association with the transmission of token 920 at block 805; for example, token 920 can be transmitted with any suitable transmission identifier that can be returned by server 105 to identify a further communication as a response to receipt of token 920. Alternatively, token 920 can be transmitted in a TCP (Transmission Control Protocol) connection, and handle 940 can be returned within the TCP connection; hence, in these implementations, provider 107 can inherently determine that handle 940 is associated with token 920.

At block 815, provider 107 receives handle 940 and stores handle 940 at non-volatile storage 412 and/or any suitable memory accessible to provider 107. In some implementations, handle 940 can be stored in association with credentials and/or subscription data associated with device 101 received in the subscription process to assist provider 107 in determining which notifications are to be transmitted. For example, provider 107 can determine that handle 940 is associated with the credentials and/or subscription data as provider 107 is generally enabled to determine that handle 940 is associated with token 920 received with the credentials and/or subscription data.

At some later time, and with reference to FIG. 10, provider 107 determines that at least one notification 1001 is to be transmitted, for example by receiving data that can be used in a notification and comparing the data to subscription data stored in association with handle 940. For example, data that can be used in a notification can be received from one or more third party news servers and/or third party data servers (not depicted) in communication with provider 107; alternatively, receiving data that can be used in a notification can be one or more of generated at and uploaded to provider 107.

In any event, at block 817 provider 107 transmits notification 1001 to server 105 with handle 940. For example, when subscription data indicates a subscription to hockey news, and hockey news is received, for example via a news service in communication with provider 107, then the hockey news is transmitted to server 105 with handle 940. Indeed, it is appreciated that when more than one persona is subscribed to a given set of data, the data that can be used in a notification is transmitted to server 105 with all handles associated with subscriptions for the data including handle 940. In other words, methods 500 and 800 are repeated for all personas and/or devices in system 100 that subscribe to data at provider 107 such that provider 107 stores a plurality of handles similar to handles 940, whether those handles are associated with one or more personas at device 101 or with personas at different devices.

In any event, at block 819, server 105 decrypts handle 940 to determine identifier 602-1, which can then be verified against data associated with channel 631-1, such as the channelID, and at block 821 notification 1001 is transmitted to device 101 to port 601-1, when port 601-1 is open. Hence, at block 823, notification 1001 is received at device 101.

Blocks 817 to 823 can be repeated whenever notifications are to be transmitted from provider 107 to server 105. Further, blocks 811 to 815 can be repeated whenever a new encryption key is available at server 105.

Further, it is generally appreciated that method 800 generally comprises: exchanging decryption data for decrypting an encrypted associated port identifier with server 105, such that time-sensitive token 920 can be transmitted by provider 107 to server 105 for decryption and verification, server 105 thereafter transmitting to provider 107 the encrypted associated port identifier, e.g. in the form of handle 940, provider 107 thereafter transmitting notifications 1001 to server 105 with the encrypted associated port identifier for delivery to device 101. Hence a port 601 is thereby registered with provider 107 to receive notifications 1001 via server 105.

Use of handle 940 generally simplifies routing of notifications by server 105: rather than requiring, for example, a massive lookup table mapping provider handle to push targets, push targets are explicitly encoded in handle 940. Further, provider 107 is never provided with an identifier of device 101; neither is provider 107 provided with a port identifier 601. In addition, such sensitive data is never transmitted in the clear.

Those skilled in the art will appreciate that in some implementations, the functionality of device 101, server 105, and provider 107 can be implemented using pre-programmed hardware or firmware elements (e.g., application specific integrated circuits (ASICs), electrically erasable programmable read-only memories (EEPROMs), etc.), or other related components. In other implementations, the functionality of device 101, server 105, and provider 107 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A method comprising:
   in response to a persona being rendered active at a communication device, determining whether any software ports have been previously assigned to an application under the persona at the communication device and, when no software port has been previously assigned, dynamically assigning a software port to the application on the basis of the persona at the communication device, and when the software port has been previously assigned, dynamically assigning the software port to the application on the basis of the persona at the communication device such that the application uses a same software port under the persona each time the persona is rendered active, the application configured to receive notifications from a given provider;

registering the software port with a server to receive the notifications;

when the persona is rendered active at the communication device, opening the software port to receive notifications associated with the persona for the application from the server, wherein the persona is rendered active by receipt of one or more of: user credentials, log-in credentials, and one or more identifiers unique to the persona at the communication device; and when the persona is rendered inactive at the communication device, closing the software port such that notifications associated with the persona are not received from the server, wherein the same application is assigned a plurality of software ports in a one-to-one relationship with each persona at the communication device under which the application is processed.

2. The method of claim 1, wherein the software port is dynamically assigned when the application is first processed at the communication device under the persona, and the software port is static thereafter with regards to the persona.

3. The method of claim 1, wherein registering the software port comprises transmitting an associated port identifier with a provider identifier to the server.

4. The method of claim 1, further comprising registering the software port with the provider to receive the notifications via the server.

5. The method of claim 4, wherein the registering the software port with the provider comprises transmitting a time-sensitive token to the provider comprising an encrypted port identifier associated with the software port.

6. The method of claim 5, further comprising exchanging decryption data for decrypting the encrypted port identifier associated with the software port with the server, such that the time-sensitive token can be transmitted by the provider to the server for decryption and verification, the server thereafter transmitting to the provider the encrypted port identifier associated with the software port, the provider thereafter transmitting the notifications to the server with the encrypted port identifier associated with the software port for delivery to the communication device.

7. A communication device comprising:
a non-volatile memory unit storing an application; and
a processing unit interconnected with a communication interface and the non-volatile memory unit, said processing unit configured to:
in response to a persona being rendered active at a communication device, determine whether any software ports have previously been assigned to an application under the persona at the communication device and, when no software port has been previously assigned, dynamically assign a software port to the application on the basis of the persona at the communication device, and when the software port has been previously assigned, dynamically assigning the software port to the application on the basis of the persona at the communication device such that the application uses a same software port under the persona each time the persona is rendered active, the application configured to receive notifications from a given provider;
register the software port with a server to receive the notifications;
open the software port when the persona is rendered active at the communication device such that notifications associated with the persona for the application are received from the server, the processing unit further configured to render the persona active by receipt of one or more of: user credentials, log-in credentials, and one or more identifiers unique to the persona at the communication device; and
close the software port when the persona is rendered inactive at the communication device such that notifications associated with the persona are not received from the server,
wherein the processing unit is further configured to assign a plurality of software ports to the same application in a one-to-one relationship with each persona at the communication device under which the application is processed.

8. The communication device of claim 7, wherein the processing unit is further configured to dynamically assign the software port when the application is first processed at the communication device under the persona, and the software port is static thereafter with regards to the persona.

9. The communication device of claim 7, wherein the processing unit is further configured to register the software port by transmitting an associated port identifier with a provider identifier to the server.

10. The communication device of claim 7, wherein the processing unit is further configured to register the software port with the provider to receive the notifications via the server.

11. The communication device of claim 10, wherein the processing unit is further configured to register the software port with the provider by transmitting a time-sensitive token to the provider comprising an encrypted port identifier associated with the software port.

12. The communication device of claim 11, wherein the processing unit is further configured to exchange decryption data for decrypting the encrypted port identifier associated with the software port with the server, such that the time-sensitive token can be transmitted by the provider to the server for decryption and verification, the server thereafter transmitting to the provider the encrypted port identifier associated with the software port, the provider thereafter transmitting the notifications to the server with the encrypted port identifier associated with the software port for delivery to the communication device.

13. A non-transitory computer-readable storage medium storing a computer program, wherein execution of the computer program is for:
in response to a persona being rendered active at a communication device, determining whether any software ports have been previously assigned to an application under the persona at the communication device and, when no software port has been previously assigned, dynamically assigning a software port to the application on the basis of the persona at the communication device, and when the software port has been previously assigned, dynamically assigning the software port to the application on the basis of the persona at the communication device such that the application uses a same software port under the persona each time the persona is rendered active, the application configured to receive notifications from a given provider;
registering the software port with a server to receive the notifications;
when the persona is rendered active at the communication device, opening the software port to receive notifications associated with the persona for the application from the server, wherein the persona is rendered active by receipt of one or more of: user credentials, log-in credentials, and one or more identifiers unique to the persona at the communication device; and when the persona is rendered inactive at the communication device, closing the software port such that notifications associated with the persona are not received from the server, wherein the same application is assigned a plurality of software ports in a one-to-one relationship with each persona at the communication device under which the application is processed.

14. The non-transitory computer-readable storage medium of claim 13, wherein the software port is dynamically assigned when the application is first processed at the communication device under the persona, and the software port is static thereafter with regards to the persona.

15. The non-transitory computer-readable storage medium of claim 13, wherein registering the software port comprises transmitting an associated port identifier with a provider identifier to the server.

16. The non-transitory computer-readable storage medium of claim 13, further comprising registering the software port with the provider to receive the notifications via the server.

17. The non-transitory computer-readable storage medium of claim 16, wherein the registering the software port with the provider comprises transmitting a time-sensitive token to the provider comprising an encrypted port identifier associated with the software port.

18. The non-transitory computer-readable storage medium of claim 17, further comprising exchanging decryption data for decrypting the encrypted port identifier associated with the software port with the server, such that the time-sensitive token can be transmitted by the provider to the server for decryption and verification, the server thereafter transmitting to the provider the encrypted port identifier associated with the software port, the provider thereafter transmitting the notifications to the server with the encrypted port identifier associated with the software port for delivery to the communication device.

* * * * *